(12) United States Patent
Jan et al.

(10) Patent No.: US 9,009,355 B1
(45) Date of Patent: Apr. 14, 2015

(54) PROCESSING REQUESTS TO A DATA STORE DURING BACK UP

(71) Applicant: EMC Corporation, Hopkinton, MA (US)

(72) Inventors: Afzal Jan, Karnataka (IN); Sarika Jain, Karnataka (IN); Prabhakaran Rathinagiri, Karnataka (IN); Nimai Sood, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/108,497

(22) Filed: Dec. 17, 2013

(51) Int. Cl.
*G06F 12/08* (2006.01)

(52) U.S. Cl.
CPC .................................. *G06F 12/0891* (2013.01)

(58) Field of Classification Search
CPC ............................ G06F 12/0891; G06F 12/08

USPC .................................................... 711/135, 118
See application file for complete search history.

(56) References Cited

U.S. PATENT DOCUMENTS

| 6,081,875 | A  | * | 6/2000 | Clifton et al. | 711/162 |
| 7,246,211 | B1 | * | 7/2007 | Beloussov et al. | 711/162 |
| 2003/0212870 | A1 | * | 11/2003 | Nowakowski | 711/162 |
| 2009/0043977 | A1 | * | 2/2009 | Kamay et al. | 711/162 |
| 2011/0283066 | A1 | * | 11/2011 | Kurashige | 711/135 |

* cited by examiner

*Primary Examiner* — Farley Abad
(74) *Attorney, Agent, or Firm* — Daly, Crowley, Mofford & Durkee, LLP

(57) ABSTRACT

In one aspect, an article includes a non-transitory computer-readable medium that stores computer-executable instructions. The instructions cause a machine to receive a write request to write data to a data store, determine if the data store is being backed up; and write the data from the write request to a cache if the data store is being backed up.

20 Claims, 6 Drawing Sheets

PROCESSING REQUESTS TO A DATA STORE DURING BACK UP

BACKGROUND

Backing up data is a process of copying and archiving of data so that it may be used to restore the original data after a data loss event. Data can be backed up for different purposes. One purpose is to recover data after its loss by deletion or corruption. Another purpose is to recover data from a previous backup.

SUMMARY

In one aspect, a method includes receiving a write request to write data to a data store, determining if the data store is being backed up and writing the data from the write request to a cache if the data store is being backed up.

In another aspect, an apparatus electronic hardware circuitry configured to receive a write request to write data to a data store; determine if the data store is being backed up; and write the data from the write request to a cache if the data store is being backed up.

In a further aspect, an article includes a non-transitory computer-readable medium that stores computer-executable instructions. The instructions cause a machine to receive a write request to write data to a data store determine if the data store is being backed up; and write the data from the write request to a cache if the data store is being backed up.

DETAILED DESCRIPTION

Described herein are techniques to perform backup of a data store without compromising concurrent write requests or read requests intended for the data store using a memory flushing option.

Most of in memory based data stores are configured with the memory flushing option. As described herein, all the data write requests are cached in a memory first and then pushed to the data store. Writing to the data store can be controlled by the flushing option (i.e., when flushing is enabled, the data will be written to the data store). When the memory flush option is disabled the content/data to be written to the data store will be held in the memory until the memory flush option is enabled.

Figure 1:
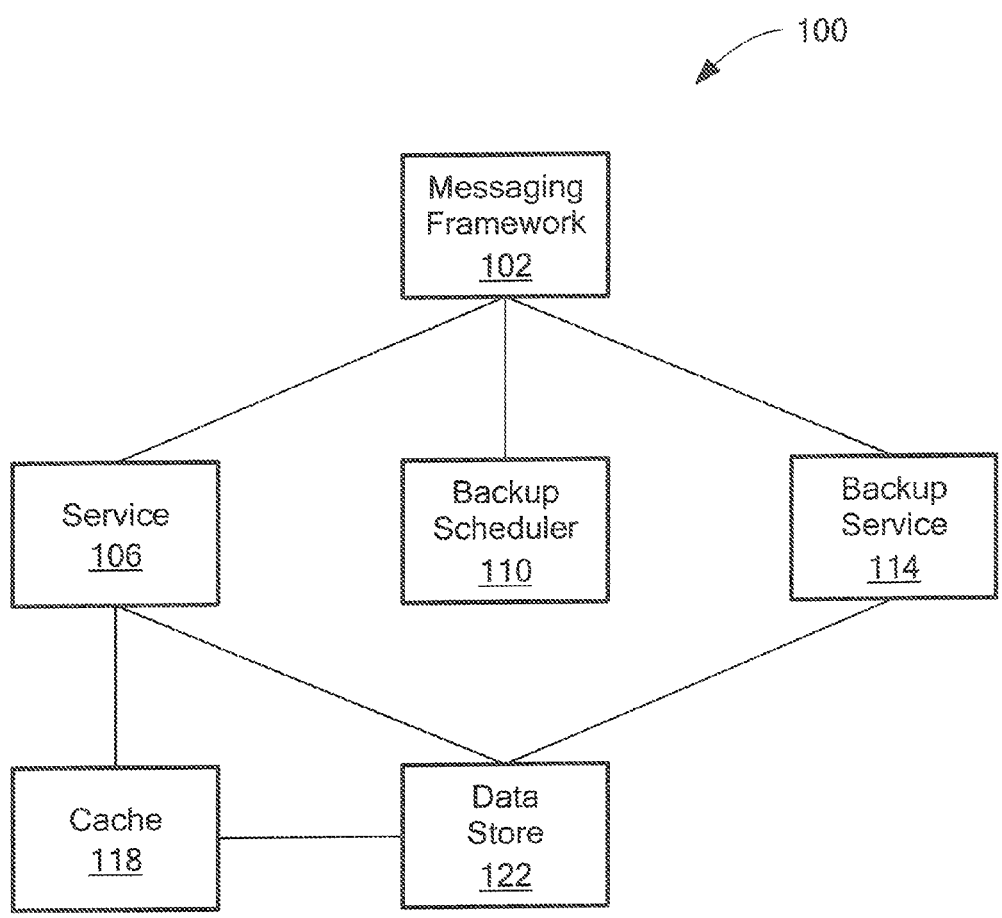
FIG. 1 is a block diagram of an example of a system used to perform backup.

Referring to FIG. 1, an example of a system to backup data is a system 100. The system 100 includes a messaging framework 102, a service 106, a backup scheduler 110, a backup service 114, a cache 118 and a data store 122.

The service 106 is an application that uses the data store 122 to store data. The backup scheduler triggers the backup of the data store 122, for example, when a backup event is detected. The backup service 114 performs backups of the data store 122 and is responsible for generating and maintaining the archived data.

In one example, the cache 118 is a memory-based cache. In another example, the cache 118 is a file-based cache. In one example, the data store 122 is an index data store.

Figure 2:
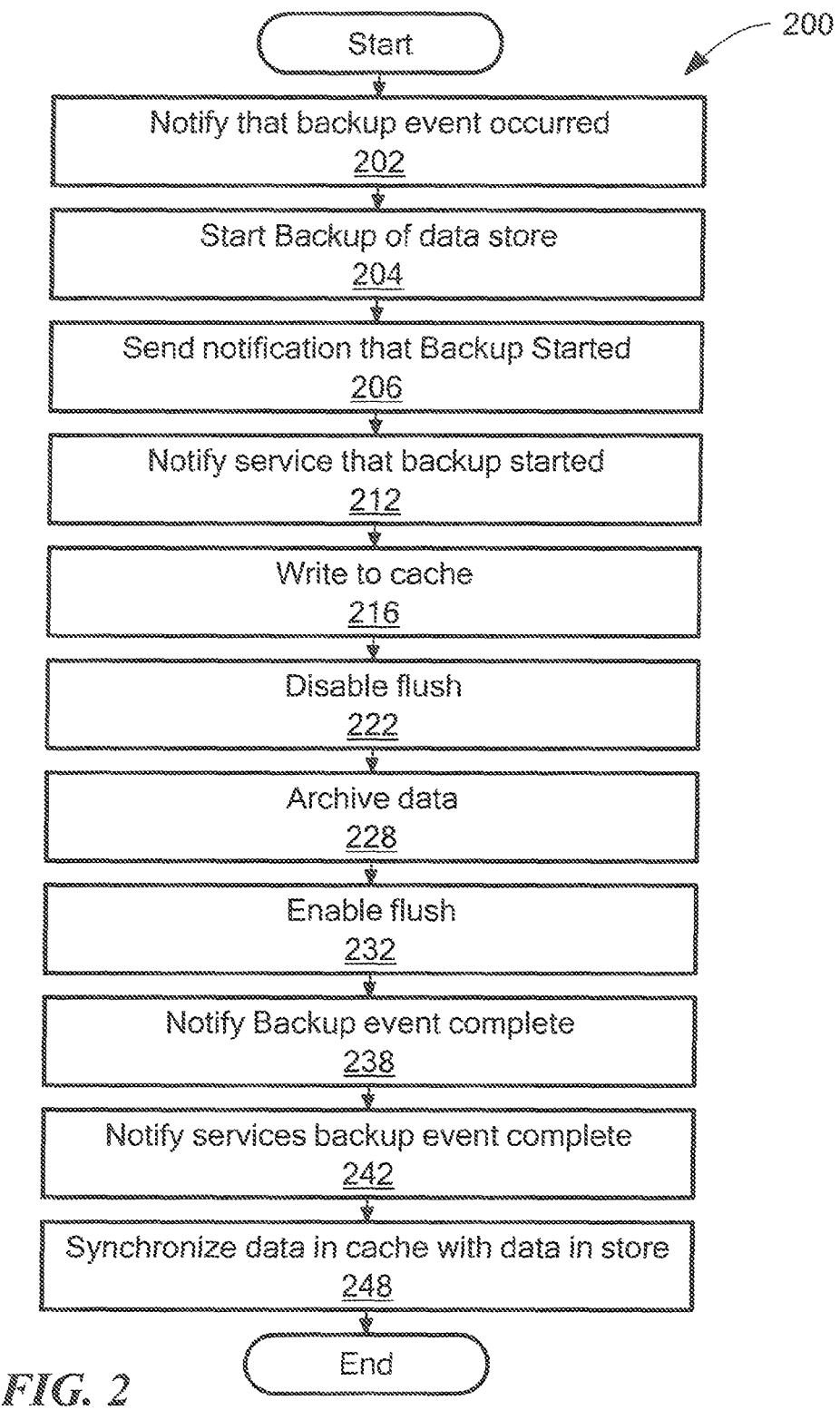
FIG. 2 is a flowchart of an example of a process to perform backup.

Referring to FIG. 2, an example of a process to perform backup is a process 200. Process 200 notifies that a backup event has occurred (202). For example, the backup scheduler 110 makes a notification to the messaging framework 102 that backup event has occurred. The backup event can be based on time or a particular event.

Process 200 starts up backup of data store (206). For example, the backup service 114 receives notification from the messaging framework 102 that a backup event has occurred and starts backing up the data store 122.

Process 200 sends notification that the backup has started (206). For example, the backup service 114 sends a notification to the messaging framework 102 that backup has started.

Process 200 notifies the service that the backup started (212). For example, the service 106 is notified through the messaging framework 102 that backup of the data store 122 has started.

Process 200 writes to the cache (216). For example, the service 106 write data from write requests received to the cache 118.

Process 200 disables flush (222), archives data (228) and enables flush (232). For example, the backup service 114 disables the memory flush at the data store 122 copies the data at the data store 122 and enables the flush at the data store.

Process 200 notifies that backup event is completed (238). For example, the backup service 114 notifies the messaging network 102 that the backup event is complete.

Process 200 notifies the service that the backup event is complete (242). For example, the messaging framework 102 notifies the service 106 that the backup event is complete.

Process 200 synchronizes data in cache with data in data store (248). For example, once the service 106 gets notification that the backup event is complete then the service 106 writes the data from cache 118 to the data store 122. Cache will be empty after synchronization.

Figure 3:
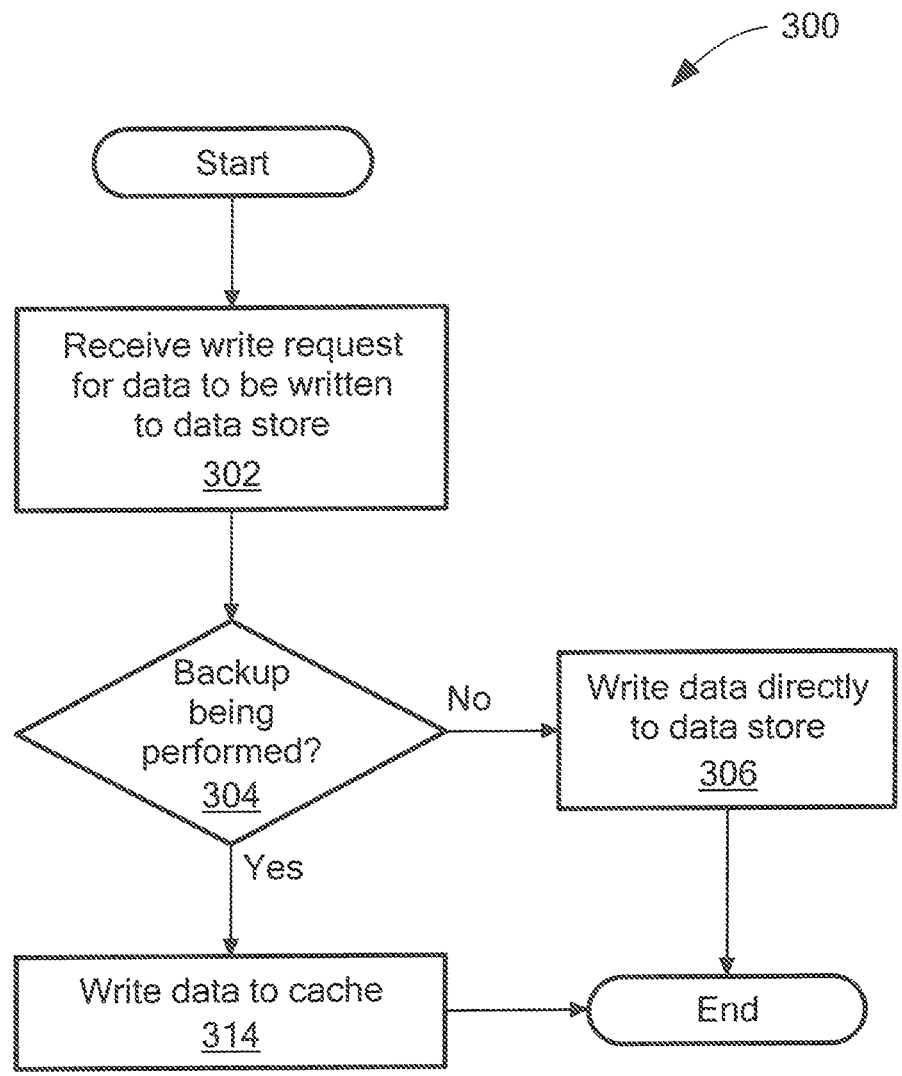
FIG. 3 is a flowchart of an example of a process to handle a write request while performing the backup process in FIG. 2.

Referring to FIG. 3, an example of a process to handle a write request while performing the backup process is a process 300. Process 300 receives a write request for data to be written to the data store (302). For example, data is received from the service 106 to be written to the data store 122.

Process 300 determines if backup is being performed (304). For example, process 300 determines if the backup service 114 is backing up the data store 122. If backup is not being performed, the data from the write request is written directly to the data store (306).

If the backup is being performed, process 300 writes the data to the cache (314). For example, the data from the write request is written to the cache 118.

Figure 4:
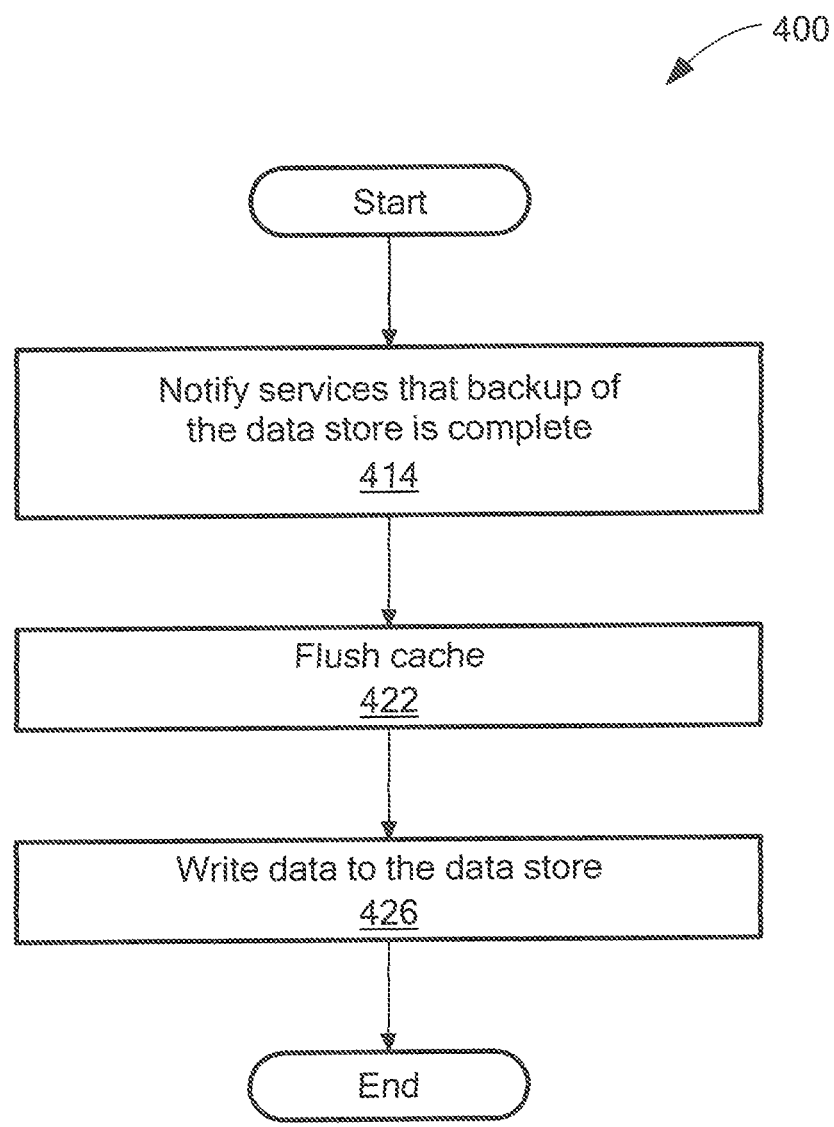
FIG. 4 is a flowchart of an example of a process to write data from the cache to the data store after the backup process in FIG. 3 is complete.

Referring to FIG. 4, an example of a process to write data from the cache 118 to the data store 122 after the backup process is complete is a process 400. Process 400 notifies services 114 that the backup of the data store 122 is complete (418). Process 400 flushes the cache 422 and writes the data that was in the cache to the data store 122 (426).

Figure 5:
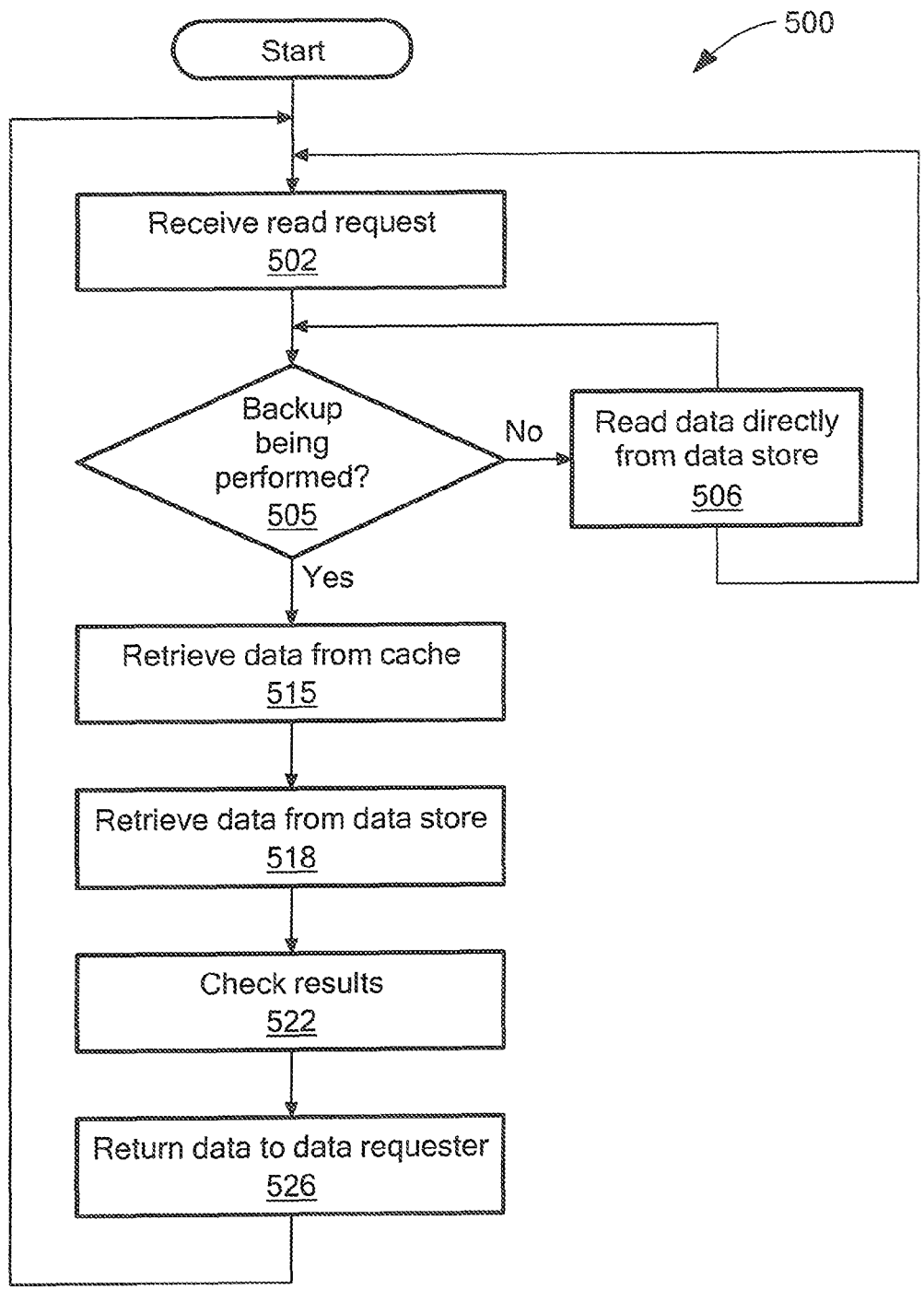
FIG. 5 is a flowchart of an example of a process to handle a read request while performing the backup process in FIG. 2.

Referring to FIG. 5, an example of a process to handle a read request while performing the backup process is a process 500. Process 500 receives a read request for data in the data store (502). For example, the service 106 requests to read data in the data store 122.

Process 500 determines if backup is being performed (504). For example, process 400 determines if the backup service 114 is backing up the data store 122. If backup is not being performed, the data from the read request is read directly from the data store (506).

If the backup is being performed, process 500 retrieves the data from the cache (514) and retrieves data from the data store (518). For example, the data requested from the read request is read from the cache 118 and the data store 122.

Process 500 checks the results (522). In particular, during backup, data will be written to the cache 118 but will not be committed to the data store 122. Hence the data should be checked in both the cache 118 and data store 122 for any read request to ensure the latest data is used.

Process 500 returns the data to the data requester (526). For example, if the service 106 issued the read request to read the data store 122, then the data is sent to the service 106.

Figure 6:
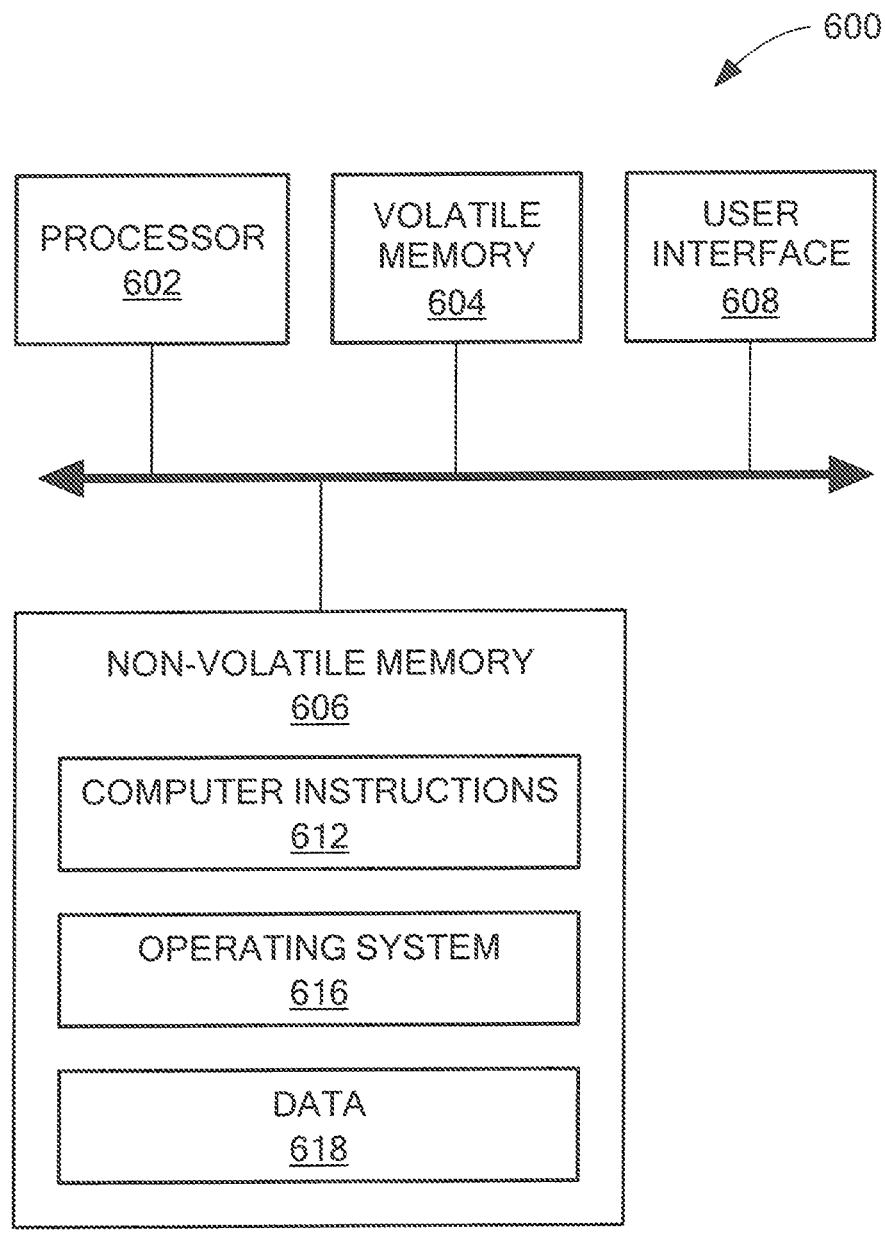
FIG. 6 is a computer on which any of the processes of FIGS. 2 to 5 may be implemented.

Referring to FIG. 6, a computer 600 includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 506 stores computer instructions 612, an operating system 516 and data 618. In one example, the computer instructions 612 are executed by the processor 602 out of volatile memory 604 to perform all or part of the processes described herein (e.g., processes 200, 300, 500 and 500).

The processes described herein (e.g., processes 200, 300, 500 and 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of; data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200, 300, 500 and 500 are not limited to the specific processing order of FIGS. 2 to 5, respectively. Rather, any of the processing blocks of FIGS. 2 to 5 may be re-ordered, combined or removed, performed in parallel or in serial, as necessary, to achieve the results set forth above.

The processing blocks (for example, in the processes 200, 300, 500 and 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
  receiving a write request to write data to a data store;
  determining if the data store is being backed up;
  writing the data from the write request to a cache if the data store is being backed up;
  receiving a read request;
  retrieving data from the cache if the data store is being backed up;
  retrieving data from the data store if the data store is being backed up; and
  checking the data from the data store with the data from the cache to ensure the latest data is sent to a requester of the read request.

2. The method of claim 1, further comprising:
  determining if the backup of the store is complete; and
  writing the data in the cache to the data store if the backup of the store is complete.

3. The method of claim 2, further comprising disabling a flush option on the data store before writing the data in the cache to the data store.

4. The method of claim 3, further comprising enabling the flush option on the data store after writing the data in the cache to the data store.

5. The method of claim 1, further comprising writing the data from the write request to the data store if the data store is not being backed up.

6. The method of claim 1, wherein receiving the write request to write the data to a data store comprises receiving the write request to write the data to an index data store.

7. The method of claim 1, wherein writing the data from the write request to a cache if the data store is being backed up comprises writing the data from the write request to one of a memory-based cache or a file-based cache.

8. An apparatus, comprising:
electronic hardware circuitry configured to:
  receive a write request to write data to a data store;
  determine if the data store is being backed up;
  write the data from the write request to a cache if the data store is being backed up;
receive a read request;
retrieve data from the cache if the data store is being backed up;
retrieve data from the data store if the data store is being backup up; and
checking the data from the data store with the data from the cache to ensure the latest data is sent to a requester of the read request.

9. The apparatus of claim 8, wherein the circuitry comprises at least one of a processor, a memory, a programmable logic device or a logic gate.

10. The apparatus of claim 8, further comprising circuitry configured to:
determine if the backup of the store is complete; and
write the data in the cache to the data store if the backup of the store is complete.

11. The apparatus of claim 10, further comprising circuitry configured to disable a flush option on the data store before writing the data in the cache to the data store.

12. The apparatus of claim 11, further comprising circuitry configured to enable the flush option on the data store after writing the data in the cache to the data store.

13. The apparatus of claim/further comprising circuitry configured to write the data from the write request to the data store if the data store is not being backed up.

14. The apparatus of claim 8, wherein the circuitry configured to receive a write request to write the data to the data store comprises circuitry configured to receive the write request to write the data to an index data store, and
wherein the circuitry configured to write the data from the write request to a cache if the data store is being backed up comprises circuitry configured to write the data from the write request to one of a memory-based cache or a file-based cache.

15. An article comprising:
a non-transitory computer-readable medium that stores computer-executable instructions, the instructions causing a machine to:
receive a write request to write data to a data store;
determine if the data store is being backed up;
write the data from the write request to a cache if the data store is being backed up;
receive a read request;
retrieve data from the cache if the data store is being backed up;
retrieve data from the data store if the data store is being backed up; and
checking the data from the data store with the data from the cache to ensure the latest data is sent to a requester of the read request.

16. The article of claim 15, further comprising instructions causing a machine to:
determine if the backup of the store is complete; and
write the data in the cache to the data store if the backup of the store is complete.

17. The article of claim 16, further comprising instructions causing a machine to disable a flush option on the data store before writing the data in the cache to the data store.

18. The article of claim 17, further comprising instructions causing a machine to enable the flush option on the data store after writing the data in the cache to the data store.

19. The article of claim 15, further comprising instructions causing a machine to write the data from the write request to the data store if the data store is not being backed up.

20. The article of claim 15, wherein the instructions causing the machine to receive a write request to write the data to the data store comprises instructions causing the machine to receive the write request to write the data to an index data store, and
wherein the instructions causing the machine to write the data from the write request to a cache if the data store is being backed up comprises instructions causing the machine to write the data from the write request to one of a memory-based cache or a file-based cache.

* * * * *